United States Patent
Sachs et al.

(10) Patent No.: US 10,149,120 B2
(45) Date of Patent: Dec. 4, 2018

(54) GROUP MESSAGE BASED CARRIER AGGREGATION CONTROL

(75) Inventors: Joachim Sachs, Sollentuna (SE); Robert Baldemair, Solna (SE); Tim Irnich, Neuss (DE); Jonas Kronander, Uppsala (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1077 days.

(21) Appl. No.: 13/884,327

(22) PCT Filed: Nov. 11, 2010

(86) PCT No.: PCT/EP2010/067309
§ 371 (c)(1),
(2), (4) Date: Jul. 25, 2013

(87) PCT Pub. No.: WO2012/062371
PCT Pub. Date: May 18, 2012

(65) Prior Publication Data
US 2013/0301444 A1    Nov. 14, 2013

(51) Int. Cl.
*H04W 4/08* (2009.01)
*H04W 72/12* (2009.01)
(Continued)

(52) U.S. Cl.
CPC .............. *H04W 4/08* (2013.01); *H04L 5/001* (2013.01); *H04L 5/0041* (2013.01);
(Continued)

(58) Field of Classification Search
CPC ... H04W 4/08; H04W 72/048; H04W 72/042; H04W 72/121; H04W 72/1289;
(Continued)

(56) References Cited

U.S. PATENT DOCUMENTS 5,214,789 A     5/1993   George
6,130,885 A  * 10/2000  Izumi .................... H04B 1/715
                                                   370/343
(Continued)

FOREIGN PATENT DOCUMENTS

WO    WO 2008/130156 A1    10/2008

OTHER PUBLICATIONS

International Search Report, PCT/EP2010/067309, dated Jul. 14, 2011.
(Continued)

*Primary Examiner* — Jenee Holland
(74) *Attorney, Agent, or Firm* — Patent Portfolio Builders, PLLC

(57) ABSTRACT

A mobile communication system includes a network based aggregation controller for controlling aggregation of component carriers from a first spectrum and a second spectrum. In addition, the mobile communication system includes a group of mobile terminals. The network based aggregation controller is configured to send a group message on at least one component carrier of the first spectrum to the group of mobile terminals. The mobile terminals receive the group message. A terminal based aggregation controller in each of the mobile terminals is configured to control operation of the respective mobile terminal with respect to the at least one component carrier of the second spectrum. This control is accomplished in response to the received group message.

20 Claims, 7 Drawing Sheets

(51) Int. Cl.
*H04L 5/00* (2006.01)
*H04W 72/04* (2009.01)

(52) U.S. Cl.
CPC .......... *H04L 5/0064* (2013.01); *H04L 5/0091* (2013.01); *H04W 72/121* (2013.01); *H04W 72/042* (2013.01); *H04W 72/1289* (2013.01)

(58) Field of Classification Search
CPC ..... H04L 5/001; H04L 5/0041; H04L 5/0064; H04L 5/0091
See application file for complete search history.

(56) References Cited

U.S. PATENT DOCUMENTS

| | | | | |
|---|---|---|---|---|
| 2002/0161841 A1* | 10/2002 | Kinnunen | H04M 3/4872 | 709/206 |
| 2003/0050064 A1* | 3/2003 | Davies | H04W 36/12 | 455/441 |
| 2003/0060159 A1* | 3/2003 | Brynielsson | G08G 1/123 | 455/11.1 |
| 2007/0121543 A1* | 5/2007 | Kuchibhotla | H04W 72/005 | 370/329 |
| 2007/0189214 A1* | 8/2007 | Hyon | H04W 72/1263 | 370/329 |
| 2008/0016190 A1* | 1/2008 | Halasz | H04W 16/10 | 709/220 |
| 2008/0076432 A1* | 3/2008 | Senarath | H04W 36/18 | 455/442 |
| 2009/0010268 A1* | 1/2009 | Giacomazzi | H04W 84/00 | 370/400 |
| 2009/0110087 A1* | 4/2009 | Liu | H04L 1/0021 | 375/260 |
| 2009/0168722 A1* | 7/2009 | Saifullah | H04W 36/0033 | 370/331 |
| 2009/0207783 A1* | 8/2009 | Choi | H04W 40/026 | 370/328 |
| 2009/0207796 A1* | 8/2009 | Chakraborty | H04L 1/0006 | 370/329 |
| 2009/0234937 A1* | 9/2009 | Buljore | H04W 24/02 | 709/220 |
| 2010/0118720 A1* | 5/2010 | Gauvreau | H04W 72/048 | 370/252 |
| 2010/0130137 A1* | 5/2010 | Pelletier | H04W 72/04 | 455/68 |
| 2010/0190506 A1* | 7/2010 | To | H04L 5/0007 | 455/452.1 |
| 2010/0215011 A1* | 8/2010 | Pan | H04L 5/0064 | 370/329 |
| 2010/0227569 A1* | 9/2010 | Bala | H04L 5/0007 | 455/73 |
| 2011/0034185 A1* | 2/2011 | Hartmaier | H04W 4/02 | 455/456.4 |
| 2011/0105107 A1* | 5/2011 | Kwon | H04W 28/06 | 455/422.1 |
| 2011/0110315 A1* | 5/2011 | Chen | H04L 5/0053 | 370/329 |
| 2011/0111753 A1* | 5/2011 | Vainikka | H04W 36/32 | 455/425 |
| 2011/0143749 A1* | 6/2011 | Guo | H04L 5/0096 | 455/424 |
| 2011/0170420 A1* | 7/2011 | Xi | H04L 5/001 | 370/241 |
| 2011/0199951 A1* | 8/2011 | Kwon | H04W 52/0212 | 370/311 |
| 2011/0243048 A1* | 10/2011 | Wang | H04L 5/0051 | 370/311 |
| 2011/0243106 A1* | 10/2011 | Hsu | H04L 5/0096 | 370/336 |
| 2011/0267978 A1* | 11/2011 | Etemad | H04L 5/003 | 370/254 |
| 2011/0274007 A1* | 11/2011 | Lin | H04L 12/28 | 370/254 |
| 2011/0274057 A1* | 11/2011 | Kuo | H04L 1/1812 | 370/329 |
| 2011/0292894 A1* | 12/2011 | Wu | H04L 1/1812 | 370/329 |
| 2011/0310937 A1* | 12/2011 | Lin | H04L 5/001 | 375/219 |
| 2012/0039199 A1* | 2/2012 | Chen | H04L 1/0027 | 370/252 |
| 2012/0099441 A1* | 4/2012 | Jung | H04L 1/1893 | 370/242 |
| 2012/0140632 A1* | 6/2012 | Norp | H04L 47/10 | 370/235 |
| 2012/0155272 A1* | 6/2012 | Quan | H04L 5/003 | 370/235 |
| 2012/0178445 A1* | 7/2012 | Dalsgaard | H04W 72/02 | 455/434 |
| 2012/0178494 A1* | 7/2012 | Haim | H04W 52/365 | 455/522 |
| 2012/0201214 A1* | 8/2012 | Li | H04W 56/001 | 370/329 |
| 2012/0207103 A1* | 8/2012 | Dai | H04W 48/08 | 370/329 |
| 2012/0218988 A1* | 8/2012 | Xu | H04W 56/0045 | 370/350 |
| 2012/0275398 A1* | 11/2012 | Chen | H04W 24/10 | 370/329 |
| 2012/0281548 A1* | 11/2012 | Lin | H04W 36/30 | 370/242 |
| 2012/0281593 A1* | 11/2012 | Stewart | H04W 16/14 | 370/259 |
| 2012/0281594 A1* | 11/2012 | Stewart | H04W 16/14 | 370/259 |
| 2012/0282942 A1* | 11/2012 | Uusitalo | H04W 16/14 | 455/452.2 |
| 2012/0300743 A1* | 11/2012 | Kim | H04L 5/0091 | 370/329 |
| 2012/0314675 A1* | 12/2012 | Vujcic | H04L 5/001 | 370/329 |
| 2013/0021979 A1* | 1/2013 | Kwon | H04W 56/0045 | 370/328 |
| 2013/0034087 A1* | 2/2013 | Kwon | H04W 56/0005 | 370/336 |
| 2013/0035108 A1* | 2/2013 | Joslyn | H04W 24/08 | 455/454 |
| 2013/0039202 A1* | 2/2013 | Feuersanger | H04L 5/001 | 370/252 |
| 2013/0039314 A1* | 2/2013 | Prateek | H04W 74/08 | 370/329 |
| 2013/0064185 A1* | 3/2013 | Jamadagni | H04L 5/0098 | 370/328 |
| 2013/0128829 A1* | 5/2013 | Sebire | H04W 72/1284 | 370/329 |
| 2013/0136006 A1* | 5/2013 | Kim | H04L 5/001 | 370/241 |
| 2013/0150004 A1* | 6/2013 | Rosen | H04W 8/22 | 455/414.1 |
| 2013/0258995 A1* | 10/2013 | Skov | H04L 5/0037 | 370/329 |
| 2013/0308519 A1* | 11/2013 | Gou | H04L 5/001 | 370/312 |
| 2014/0071908 A1* | 3/2014 | Sachs | H04L 1/1893 | 370/329 |
| 2014/0119313 A1* | 5/2014 | Yang | H04L 5/001 | 370/329 |
| 2015/0029964 A1* | 1/2015 | Seo | H04L 1/0027 | 370/329 |
| 2015/0245344 A1* | 8/2015 | You | H04J 11/00 | 370/280 |

OTHER PUBLICATIONS

Written Opinion of the International Searching Authority, PCT/EP2010/067309, dated Jul. 14, 2011.
M. Iwamura et al.:"Carrier aggregation framework in 3GPP LTE-advanced [WiMAX/LTE Update]", IEEE Communications Maga-

(56) References Cited

OTHER PUBLICATIONS zine, IEEE Service Center, Piscataway, US vol. 48, No. 8, Aug. 1, 2010, pp. 60-67, XP011315996, ISSN: 0163-6804.
M. Kiiski: LTE-Advanced: The mainstream in mobile broadband evolution:, Wireless Conference (EW), 2010 European, IEEE Piscataway, NJ, USA, Apr. 12, 2010, pp. 983-988, XP031688565, ISBN: 978-1-4244-5999-5.
Sharp: "Cross carrier power control with group TPC commands", 3GPP Draft; R1-104517, $3^{rd}$ Generation Partnership Project; (3GPP), MobileCompetence Centre; 650, Route Des Lucioles; F-06921 Sophia-Antipolis Cedex; France, vol. RAN WG1, No. Madrid, Spain; Aug. 23, 2010, Aug. 17, 2010, XP050449822, 4pp.
Office Action in EP application No. 10775835.1 dated Jan. 31, 2018.

\* cited by examiner

US 10,149,120 B2

GROUP MESSAGE BASED CARRIER AGGREGATION CONTROL

CROSS REFERENCE TO RELATED APPLICATION

This application is a 35 U.S.C. § 371 national stage application of PCT International Application No. PCT/EP2010/067309, filed on 11 Nov. 2010, the disclosure and content of which is incorporated by reference herein in its entirety. The above-referenced PCT International Application was published in the English language as International Publication No. WO 2012/062371 A1 on 18 May 2012.

TECHNICAL FIELD

The present invention relates to methods for controlling carrier aggregation and to corresponding devices and systems.

BACKGROUND

In mobile communication networks, e.g., according to the technical specifications of the Third Generation Partnership Project (3GPP), concepts have been introduced according to which several channels using different carriers can be bundled in a single radio link. These concepts are also referred to as carrier aggregation. More generally, carrier aggregation can be defined as defining a constellation of two or more component carriers to be used for signal transmission. Examples of carrier aggregation are contiguous carrier aggregation, in which the constellation consists of two or more adjacent component carriers, non contiguous intra-band carrier aggregation, in which the constellation consists of two or more non-adjacent component carriers from the same frequency band or spectrum, and inter-band carrier aggregation or spectrum aggregation, in which the constellation consists of two or more component carriers from at least two different frequency bands or spectra. In the following, the term spectrum will be used to refer to a frequency band, i.e., a contiguous frequency range, or to a group of frequency bands which do not need to be contiguous among each other.

Typically carrier aggregation in a mobile communication network is done with component carriers from a spectrum allocated to the radio access technology of the mobile communication network, e.g., a licensed spectrum. However, the number of such spectra and also the number of component carriers in such spectra is limited. A way of increasing the number of component carriers available for carrier aggregation is so-called secondary or opportunistic use of a spectrum that is primarily used by another technology, e.g., a television, a satellite or a radar technology. In this way, a significant increase of transmission capacity can be obtained. However, it also needs to be taken into account that the secondary use of a spectrum does not interfere with a primary user of this spectrum. For example, regulatory rules for secondary spectrum access of television channels have been defined by the United States Federal Communications Commission (US FCC).

Typically, a secondary spectrum may be used opportunistically by the mobile communication network while not interfering with a primary user of the secondary spectrum, e.g., while primary users are inactive. However, a primary user may become active at some time, which means that component carriers in the secondary spectrum may need to be vacated very quickly, e.g., within some milliseconds.

Accordingly, there is a need for techniques which allow for efficiently controlling aggregation of component carriers from different spectra.

SUMMARY

According to an embodiment of the invention, a method of controlling aggregation of component carriers from a first spectrum and a second spectrum is provided. The method may be implemented by a network device provided with a network based aggregation controller. According to the method, a group message is transmitted on at least one component carrier from the first spectrum to a group of mobile terminals. The group message controls operation of the mobile terminals of the group with respect to at least one component carrier from the second spectrum.

According to a further embodiment of the invention, a further method of controlling aggregation of component carriers from a first spectrum and a second spectrum is provided. The method may be implemented by a mobile terminal provided with a terminal based aggregation controller. According to the method, a mobile terminal receives a group message on at least one component carrier from the first spectrum. The group message is addressed to a group of mobile terminals including the mobile terminal receiving the group message. In response to the received group message, the mobile terminal controls its operation with respect to at least one component carrier from the second spectrum.

According to a further embodiment of the invention, a network device is provided. The network device is provided with an aggregation controller. The aggregation controller is configured to control aggregation of component carriers from a first spectrum and a second spectrum. The aggregation controller comprises a control interface configured to transmit a group message on at least one component carrier from the first spectrum to a group of mobile terminals. The group message controls operation of the mobile terminals of the group with respect to the at least one component carrier from the second spectrum.

According to a further embodiment of the invention, a mobile terminal is provided. The mobile terminal is provided with an aggregation controller and a radio interface. The aggregation controller is configured to control aggregation of component carriers from a first spectrum and a second spectrum. The radio interface is configured to receive a group message on at least one component carrier from the first spectrum. The group message is addressed to a group of mobile terminals including the mobile terminal. The aggregation controller is configured to control operation of the mobile terminal with respect to the at least one component carrier from the second spectrum. This control is accomplished in response to the received group message.

According to a further embodiment of the invention, a mobile communication system is provided. The mobile communication system includes a network based aggregation controller for controlling aggregation of component carriers from a first spectrum and a second spectrum and a group of mobile terminals. The network based aggregation controller is provided with a control interface. The control interface is configured to send a group message on at least one component carrier from the first spectrum to the group of mobile terminals. Each of the mobile terminals is provided with a radio interface configured to receive the group message. Further, each of the mobile terminals is provided with a terminal based aggregation controller. The terminal based aggregation controller is configured to control operation of the respective mobile terminal with respect to the at least one component carrier from the second spectrum. This control is accomplished in response to the received group message.

According to further embodiments, other methods, devices, or computer program products for implementing the methods may be provided.

DETAILED DESCRIPTION OF EMBODIMENTS

In the following, the invention will be explained in more detail by referring to exemplary embodiments and to the accompanying drawings. The illustrated embodiments relate to concepts for controlling carrier aggregation in radio communication between mobile terminals and an access node. In the illustrated examples, it will be assumed that the radio communication is implemented according to 3GPP LTE. However, it is to be understood that the illustrated concepts may also be applied in other types of mobile communication networks.

Figure 1:
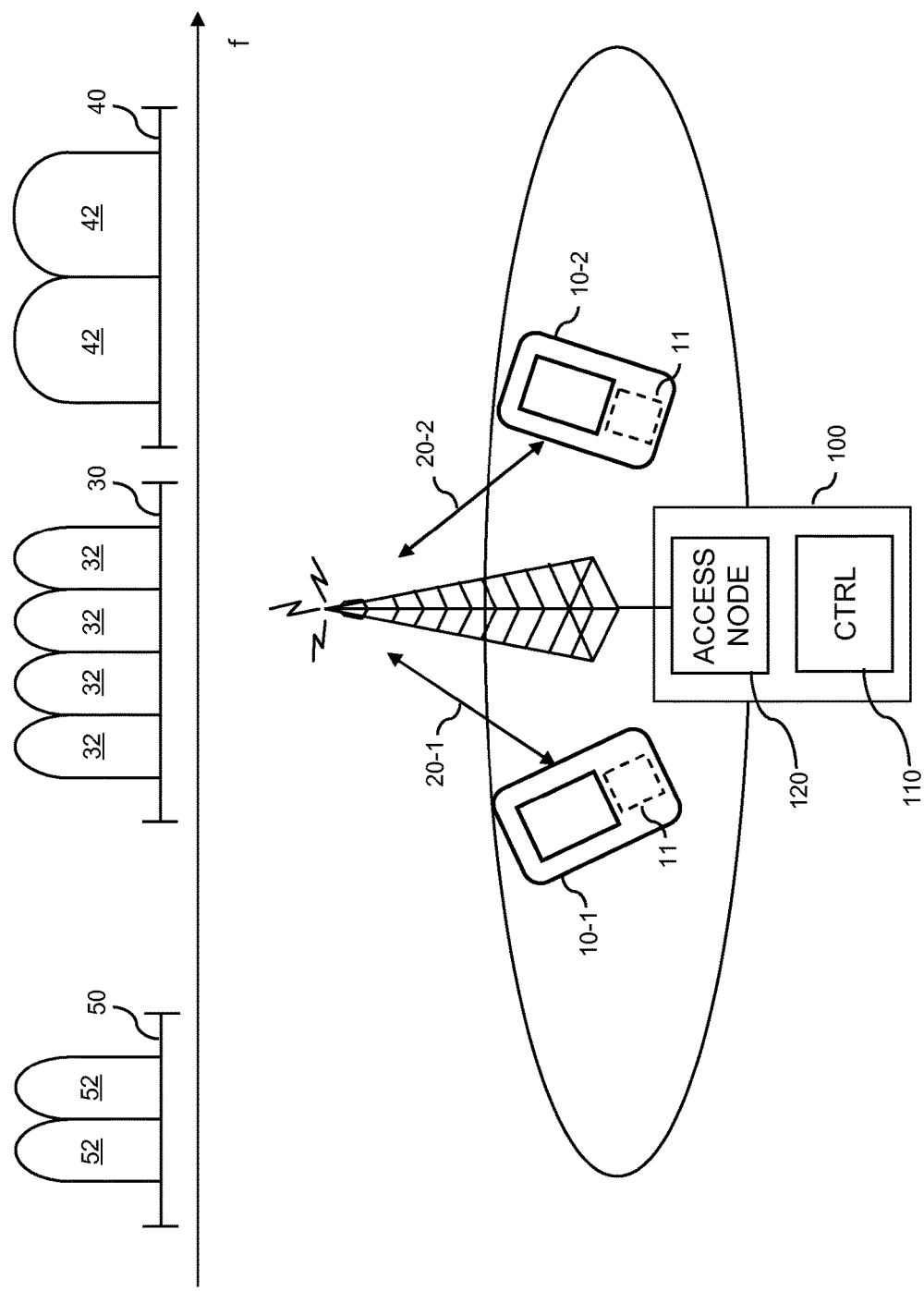
FIG. 1 schematically illustrates a mobile communication network environment in which concepts of carrier aggregation according to an embodiment of the invention are applied.

FIG. 1 schematically illustrates a mobile communication network environment, i.e., infrastructure of a mobile communication network, represented by a network device 100, and mobile terminals 10-1, 10-2 to be used in the mobile communication network. The mobile terminals 10-1, 10-2 may be, e.g., mobile phones, portable computers, or other types of user equipment (UE). In the following, the mobile terminals 10-1, 10-2 will also be referred to as UEs. The network device 100 is provided with a network based aggregation controller (CTRL) 110 and an access node 120. The mobile terminals 10-1, 10-2 are each provided with a terminal based aggregation controller 11. As illustrated, the mobile terminals 10-1, 10-2 communicate with the access node 120 of the network device 100 via respective radio links 20-1 and 20-2. In accordance with the illustrated 3GPP LTE scenario, the network device 100 may be an enhanced Node B (eNB) and the radio links 20-1, 20-2 may be established using the Uu radio interface. The radio links 20-1, 20-2 may carry data traffic in a downlink (DL) direction from the access node 120 to the UE 10-1, 10-2 and/or in an uplink (UL) direction from the UE 10-1, 10-2 to the access node 120.

In accordance with the concepts as described herein, carrier aggregation may be used for the radio communication between the mobile terminals 10-1, 10-2 and the access node 120. That is to say, a constellation of multiple component carriers may be used for transmitting radio signals on the radio link 20-1, 20-2 between each UE 10-1, 10-2 and the access node 120. In FIG. 1, different spectra 30, 40, 50 are illustrated, from which the component carriers can be selected. The spectrum 30 is illustrated as including component carriers 32, the spectrum 40 is illustrated as including component carriers 42, and the spectrum 50 is illustrated as including component carriers 52. Each of the component carriers 32, 42, 52 will typically have at least one supported bandwidth. In some embodiments, some of the component carriers 32, 42, 52 may support multiple bandwidths, e.g., as defined for 3GPP LTE.

In the following, it will be assumed that the spectrum 30 is a spectrum which is assigned to a radio access technology of the mobile communication network. Accordingly, in the illustrated 3GPP LTE scenario, the spectrum 30 may be an LTE spectrum as defined in 3GPP technical specification 36.101. The other spectra 40, 50 may be spectra which are not assigned to the radio access technology of the mobile communication network. For example, the other spectra 40, 50 may be assigned to other technologies, such as a television technology, a radar technology, or a satellite technology. However, in some embodiments also one or more of the other spectra 40, 50 could be assigned to the radio access technology of the mobile communication network, e.g., to be used as auxiliary spectra. In some embodiments, one or more of the other spectra 40, 50 could be assigned to the radio access technology of the mobile communication network, but be licensed to the operator of another mobile communication network using the same radio access technology. In such a scenario this operator may still allow secondary usage of his licensed spectrum, e.g., in a temporally or regionally limited manner. As illustrated, the other spectra 40, 50 may be in a different frequency range than the spectrum 30, i.e., in a higher frequency range, as the spectrum 40, or in a lower frequency range, as the spectrum 50. However, it is to be understood that the other spectra 40, 50 may also overlap with the spectrum 30. That is to say, in some scenarios there may be arrangements of interleaved frequency bands belonging to different spectra 30, 40, 50.

According to embodiments as described herein, capacity of the mobile communication network may be expanded by carrier aggregation with additional usage of the component carriers 42, 52 from the other spectra 40, 50. In some embodiments, these are not assigned to the radio access technology of the mobile communication network. In the case of usage of a component carrier 42, 52 from one of the other spectra 40, 50, the constellation of component carriers used on the radio link 20-1, 20-2 will therefore include one or more component carriers 32 from the spectrum 30 and one or more component carriers 42, 52 from the spectrum 40 and/or 50.

In order to provide efficient control of carrier aggregation for the different UEs 10-1, 10-2, concepts of controlling carrier aggregation according to embodiments of the invention as explained in the following are based on transmitting a group message from the network based aggregation controller 110 to the terminal based aggregation controllers 11 of a group of UEs. The group message controls operation of the UEs of the group with respect to at least one component carrier 42, 52 from the other spectra 40, 50. In response to receiving the group message, the terminal based aggregation controllers 11 will perform corresponding control operations. Such a group of UEs could be formed of the UEs 10-1, 10-2 as illustrated in FIG. 1. Accordingly, a single message can be used to initiate control processes in multiple UEs. As a result, signaling overhead may be reduced and execution time of procedures to change the component carrier configuration or constellation of carrier aggregation can be reduced. For example, release or deactivation of a component carrier used for UL and/or DL communication of user data can be executed very quickly by all UEs of the group.

Figure 2:
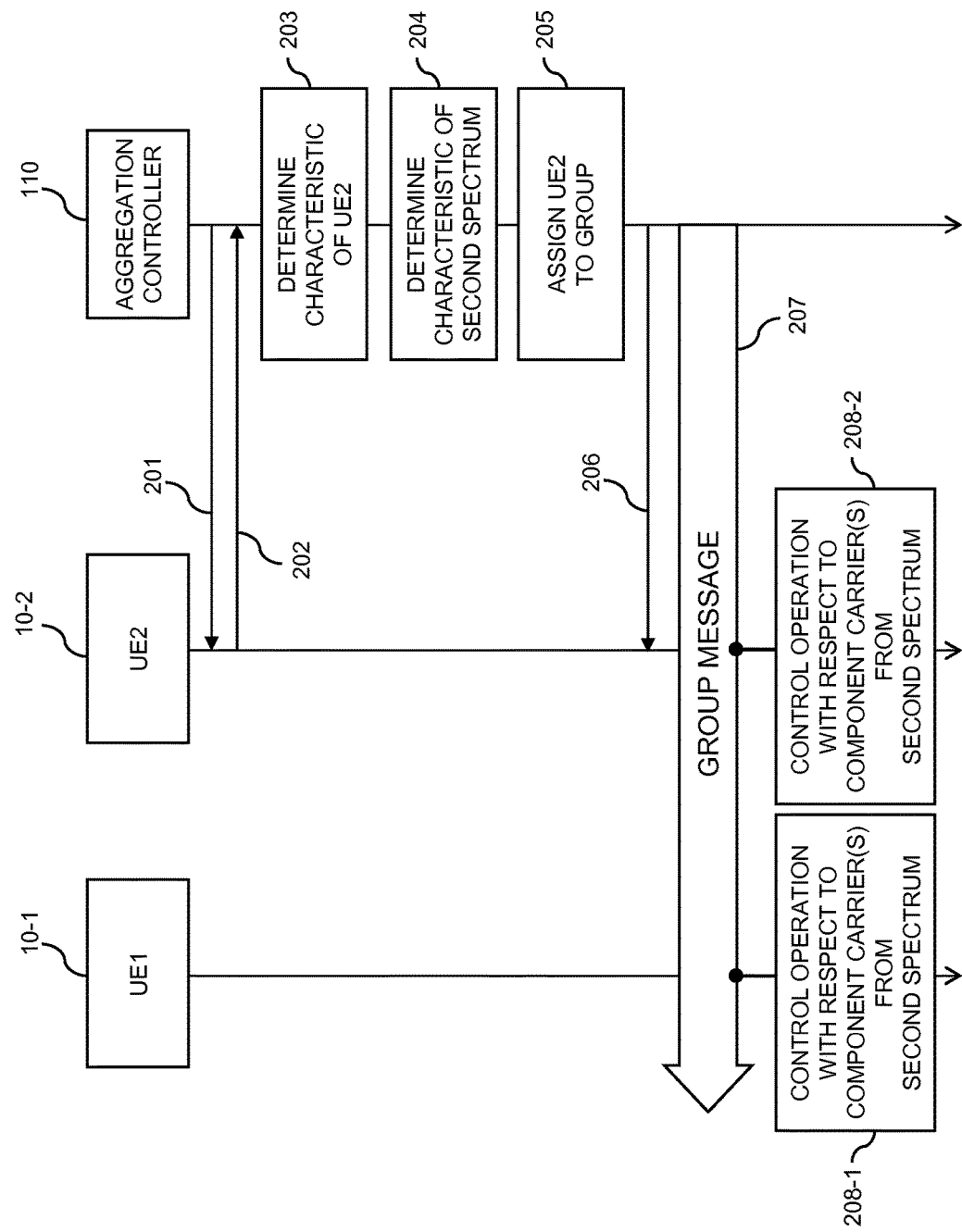
FIG. 2 shows a signaling diagram for illustrating an exemplary scenario of controlling carrier aggregation according to an embodiment of the invention.

FIG. 2 shows a signaling diagram for illustrating an exemplary scenario of using group message based carrier aggregation control according to an embodiment of the invention. The signaling of FIG. 2 occurs between the network based aggregation controller 110 and the UEs 10-1, 10-2. It is assumed that the process starts in a situation in which the UE 10-1 already is part of a group of UEs which are allowed to use one or more component carriers 42, 52 from one or more of the other spectra 40, 50 and that the UE 10-2 is not yet part of this group. In some scenarios, the group may be defined to include UEs allowed to use one specific component carrier 42, 52 from one of the other spectra 40, 50. In other scenarios, the group may be defined to include UEs allowed to use a certain group of component carriers 42, 52 from one or more of the other spectra 40, 50. Defining the group of UEs with respect to a group of component carriers 42, 52 from one or more of the other spectra 40, 50 may be useful if it is likely that the same control operations will need to be performed for these component carriers 42, 52, e.g., activation or deactivation of component carriers 42, 52 in a certain frequency range or activation or deactivation of all component carriers defined in one of the other spectra 40, 50. For example, the group of component carriers 42, 52 could correspond to all component carriers 42 defined in the spectrum 40 or to all component carriers 52 defined in the spectrum 50. In some embodiments, the group of component carriers 42, 52 may additionally include one or more of the component carriers 32 from the spectrum 30. The usage of the component carrier 42, 52 may be for UL communication and/or for DL communication of user data. The usage may also be for measurement purposes, e.g., in preparation of transmission of user data on the component carrier 42, 52 from the other spectra 40, 50 or for detecting activity of a primary user. The group may be identified by a group identifier. The group identifier may for example be a Radio Network Temporary Identity.

Initially, messages 201, 202 may be exchanged between the network based aggregation controller 110 and the UE 10-2. At step 203, the network based aggregation controller 110 may use these messages 201, 202 to determine one or more characteristic of the UE 10-2.

For example, such a characteristic of the UE 10-2 may be a capability of the UE 10-2 to use component carriers 42, 52 from the other spectrum 40, 50. More specifically, it may be a capability to use the same component carrier 42, 52 or group of component carriers 42, 52 defining group of UEs. The capability may also take into account whether the UE 10-2 supports the frequency band and/or the bandwidth(s) of the component carrier 42, 52 or group of component carriers 42, 52. Further, the capability may take into account whether the UE 10-2 supports simultaneous usage of different frequency bands, or whether it is already configured to use a component carrier, e.g., one or more of the component carriers 32 from the spectrum 30, that is not compatible to be used simultaneously with the considered component carrier 42, 52 or group of component carriers 42, 52 from the other spectra 40, 50.

Further, such a characteristic of the UE 10-2 may also be a location of the UE 10-2, a velocity of the UE 10-2, and/or a direction of movement of the UE 10-2. The location of the UE 10-2 may be determined using terminal based positioning methods, e.g., on the basis of satellite positioning signals, or using network based positioning methods, e.g., from the radio signals transmitted with respect to cells of the mobile communication network. The velocity of the UE 10-2 may be determined from the rate of change of the location of the UE 10-2 or from variations of path loss measurements or from a frequency of handovers between cells of the mobile communication network. The direction of movement of the UE 10-2 may be determined, e.g., by tracking the location of the UE 10-2. For example, determining the location of the UE 10-2 may be useful if the component carrier 42, 52 or group of component carriers from the other spectrum 40, 50 is only allowed to be used in certain locations, e.g., within a so called white space of a television channel as specified according to a regulatory protection zone around active television transmitters using this television channel. Further, determining the velocity and/or direction of movement of the UE 10-2 may be useful for taking into account whether the UE 10-2 is likely to enter or leave a region where the component carrier 42, 52 or group of component carriers from the other spectrum 40, 50 is only allowed to be used.

Further, such a characteristic may also be a traffic demand of the UE 10-2. For example, the UE 10-2 may have certain traffic demand, which can be different for the UL direction and the DL direction. In order to meet this traffic demand, the UE 10-2 may use multiple component carriers 32 from the spectrum 30 for the UL and/or the DL direction. Depending on the traffic demand of the UE 10-2, the data rate that can be provided for the UE 10-2 by allowing the UE 10-2 to use one or more component carriers 42, 52 from one or more of the other spectra depends on the particular resulting constellation of component carriers 32, 42, 52 and on the load on the component carriers of the resulting constellation.

Accordingly, determining the traffic demand of the UE 10-2 can be useful when deciding whether the UE 10-2 should be allowed to use one or more component carriers 42, 52 from one or more of the other spectra 40, 50.

For example, the UE 10-2 may be one of several UEs that are using a set of component carriers 32 from the spectrum 30, causing a high load on these component carriers 32. Due to this high load, the data rate that can be provided for the UE 10-2 can be lower than the traffic demand of the UE 10-2. However, a higher data rate could be provided for the UE 10-2 by allowing it to use one or more component carriers 42, 52 from one or more of the other spectra 40, 50. At the same time, the load on the set of component carriers 32 from the spectrum 30 would be decreased, which is beneficial for the other UEs using this set of component carriers 32. In view of the latter consideration, it may also be useful to allow the UE 10-2 to use one or more component carriers 42, 52 from one or more of the other spectra 40, 50 if this does not increase the data rate which can be provided for the UE 10-2. However, it may then still be considered whether the new data rate that can be provided for the UE 10-2 meets the traffic demand of the UE 10-2.

According to further examples, the network based aggregation controller 110 may also use network based sources for determining the characteristic of the UE 10-2, e.g., information from a subscriber database.

At step 204, the network based aggregation controller 110 may further determine a characteristic of the spectrum 40, 50 from which the component carrier 42, 52 or group of component carriers 42, 52 is selected. This may be accomplished on the basis of the messages 201 or 202 or using other information, e.g., information from network based sources such as a database. For example, an availability of the spectrum 40, 50 may be determined. This may also be combined with characteristics of the UE 10-2 as determined at step 203, e.g., by determining an availability of the spectrum 40, 50 at the location of the UE 10-2.

At step 205, the network based aggregation controller 110 assigns the UE 10-2 to the group of UEs. This may be accomplished on the basis of the characteristic of the UE 10-2 as determined at step 204 and/or the characteristic of the spectrum 40, 50 as determined at step 204. For example, the UE 10-2 may be assigned to the group if it is capable of using the component carrier 42, 52 or group of component carriers 42, 52 from the spectrum 40, 50. Also, the UE 10-2 may be assigned to the group if the component carrier 42, 52 or group of component carriers 42, 52 from the spectrum 40, 50 is available at the location of the UE 10-2. Further, when further taking into account the velocity of the UE 10-2, it may also be considered whether it is likely that the UE 10-2 will enter or leave a coverage region of the component carrier 42, 52 or group of component carriers 42, 52 from the other spectrum 40, 50. For example, if the UE 10-2 is determined to be close to the edge of the coverage region and optionally also moving at a velocity above a given threshold and/or in a direction of movement toward the edge of the coverage region, the network based aggregation controller 110 may decide not to assign the UE 10-2 to the group. Moreover, the UE 10-2 may be assigned to the group if usage of the component carrier 42, 52 or group of component carriers 42, 52 from the other spectrum 40, 50 by the UE 10-2 allows to meet the traffic demand of the UE 10-2. In some embodiments, the decision at step 205 may also be based on characteristics of other UEs, e.g., if it is intended to meet the traffic of one or more other UE by controlling carrier aggregation by the UE 10-2.

If the UE 10-2 is assigned to the group, this may be indicated to the UE 10-2 by sending a message 206 to the UE 10-2. For example, the message 206 may indicate the group identifier to the UE 10-2.

The network based aggregation controller 110 can now transmit a group message 207 addressed to the UEs of the group so as to control operation of the UEs of the group with respect to the component carrier 42, 52 or group of component carriers 42, 52 from the other spectrum 40, 50. In some embodiments, the group message 207 may also control operation of the UEs of the group with respect to one or more of the component carriers 32 from the other spectrum 30. In the illustration of FIG. 2, it is assumed that the UE 10-2 was assigned to the group at step 205 and informed of this assignment by the message 206. The group message 207 will therefore be received both by the UE 10-1 and by the UE 10-2. For example, the UEs 10-1 and 10-2 may determine from the group identifier that they are intended recipients of group message 207. Typically, other UEs, which are not part of the group, will not be able to receive or decode the group message. In some embodiments, it is also possible that such other UEs will disregard the group message 207.

The group message 207 is transmitted on at least one component carrier 32 of the spectrum 30, i.e., the spectrum assigned to the radio access technology of the mobile communication system. In this way, the group message 207 can be transmitted in a reliable manner. In particular, interferences due to other users of the spectra 40, 50 will not affect the transmission of the group message 207. Also, in some embodiments the group message 207 may be transmitted at a lower code rate than usual payload transmissions to the UEs of the group. In this way, the risk of the group message 207 not being successfully received by all UEs of the group can be reduced.

In the illustrated 3GPP LTE scenario, the group message 207 may be transmitted on the Physical DL Control Channel (PDCCH). Alternatively, the group message 207 may also be transmitted on the Physical DL Shared Channel (PDSCH), e.g., by using the group identifier to address a signaling element of the PDSCH. Accordingly, when assuming that all UEs of the group are located in the same cell of the mobile communication network, the group message 207 will be transmitted on component carriers 32 allocated to all UEs of the group.

The group message 207 may control various operations of the UEs of the group with respect to the component carrier 42, 52 or group of component carriers 42, 52 from the other spectrum 40, 50, and optionally also with respect to one or more of the component carriers 32 from the spectrum 30. For the UE 10-1 this is indicated at step 208-1, and for the UE 10-2 this indicated at step 208-2. For example, the group message 207 could activate usage of the component carrier 42, 52 or group of component carriers 42, 52 by the UEs of the group. In some embodiment, the group message 207 may further also activate usage of one or more of the component carriers 32 from the spectrum 30. The UEs of the group would then be allowed to transmit or receive user data on the activated component carrier(s). Further, the group message 207 could also deactivate usage of the component carrier 42, 52 or group of component carriers 42, 52 by the UEs of the group. In some embodiment, the group message 207 may further also deactivate usage of one or more of the component carriers 32 from the spectrum 30. In particular, the UEs of the group may be caused to stop transmitting any signals on the deactivated component carrier(s) 42, 52. Further, the UEs of the group may be caused to stop performing measurements on the component carrier 42, 52 or group of component carriers 42, 52, and optionally also on one ore more of the component carriers 32 of the spectrum 30. In some scenarios, the group message 207 could be used for activating and deactivating usage of the component carriers from one or more of the other spectra 40, 50, and optionally also on one ore more of the component carriers 32 of the spectrum 30, on the basis of a time schedule and/or in response to load measurements in the mobile communication network. In this way, the component carriers 42, 52 could be used during high-load periods to provide additional capacity, and their usage could be deactivated during low-load periods to save energy. When activating one or more of the component carriers 42, 52 from the other spectra 40, 50, one or more component carriers 32 from the spectrum 30 could be deactivated. Similarly, when deactivating one or more of the component carriers 42, 52 from the other spectra 40, 50, one or more component carriers 32 from the spectrum 30 could be activated. In this way, switching between inter spectrum carrier aggregation and intra spectrum carrier aggregation could be efficiently triggered by the group message 207. In some embodiments, the group message 207 may also control the UEs of the group with respect to performing measurements on the component carriers 42, 52, and optionally also on one ore more of the component carriers 32 of the spectrum 30, e.g., by providing data to define a measurement configuration. These data may include, e.g., parameters such as detection thresholds or measurement times.

In order to allow for controlling the operation of the UEs in the desired manner, the group message 207 may include control data to be used by the UEs of the group for controlling their operation. For example, the group message 207 may include an indicator of the type of operation to be controlled, e.g, activation, deactivation, or measurement configuration. Further, in some embodiments the group message 207 may also include data for defining for which component carriers 42, 52 from the other spectrum 40, 50, and optionally also on one ore more of the component carriers 32 of the spectrum 30, the operation is to be controlled. For example, if the component carriers 32, 42, 52 in the spectra 30, 40, 50 each have a unique identifier, the group message 207 could include a list of identifiers of component carriers that are to be controlled. Each UE of the group may then accomplish the control operation for those component carriers 32, 42, 52 which are defined by the list. In other embodiments, the group identifier may be assigned in such a way that it allows for determining which component carriers 32, 42, 52 are to be controlled, e.g., by providing a unique correspondence between the group identifier and the component carriers 32, 42, 52 that are to be controlled.

In some embodiments, the same group identifier can be used for controlling operations with respect to both UL and DL component carriers 32, 42, 52. For example, the group message 207 could then include a list of identifiers of both UL and DL component carriers 32, 42, 52 that are to be controlled. In some embodiments, separate group identifiers can be provided for UL and DL component carriers 32, 42, 52. For example, in the case of controlling operations with respect to UL component carriers 32, 42, 52, the group message 207 could then include a list of identifiers of only UL component carriers 32, 42, 52 that are to be controlled. Similarly, in the case of deactivating DL component carriers 32, 42, 52, the group message 207 could then include a list of identifiers of only DL component carriers 42, 52 that are to be controlled.

According to some embodiments, rules may be defined in the UEs for controlling their operation with respect to the component carrier 42, 52 or group of component carriers 42, 52 from the other spectrum 40, 50, and optionally also with respect to one ore more of the component carriers 32 from the spectrum 30. For example, when assuming that there is an association of UL component carriers 32, 42, 52 with corresponding DL component carriers 32, 42, 52, a rule could define that the UL component carrier 32, 42, 52 is activated when the corresponding DL component carrier 32, 42, 52 is activated, or vice versa. In this way, a control operation would need to be explicitly signaled by the group message 207 either for only the DL component carriers 32, 42, 52 or for only the UL component carriers. Further, when assuming that there is an association of component carriers 42, 52 from the spectra 40, 50 with corresponding component carriers 32 from the spectrum 30, a rule could define that one or more of the component carriers 32 from the spectrum 30 are activated when one or more corresponding component carriers 42, 52 from the other spectra 40, 50 are deactivated, or vice versa. In this way, the group message 207 could be used to efficiently switch between component carriers 32 from the spectrum 30 and component carriers from the spectra 40, 50.

Figure 3:
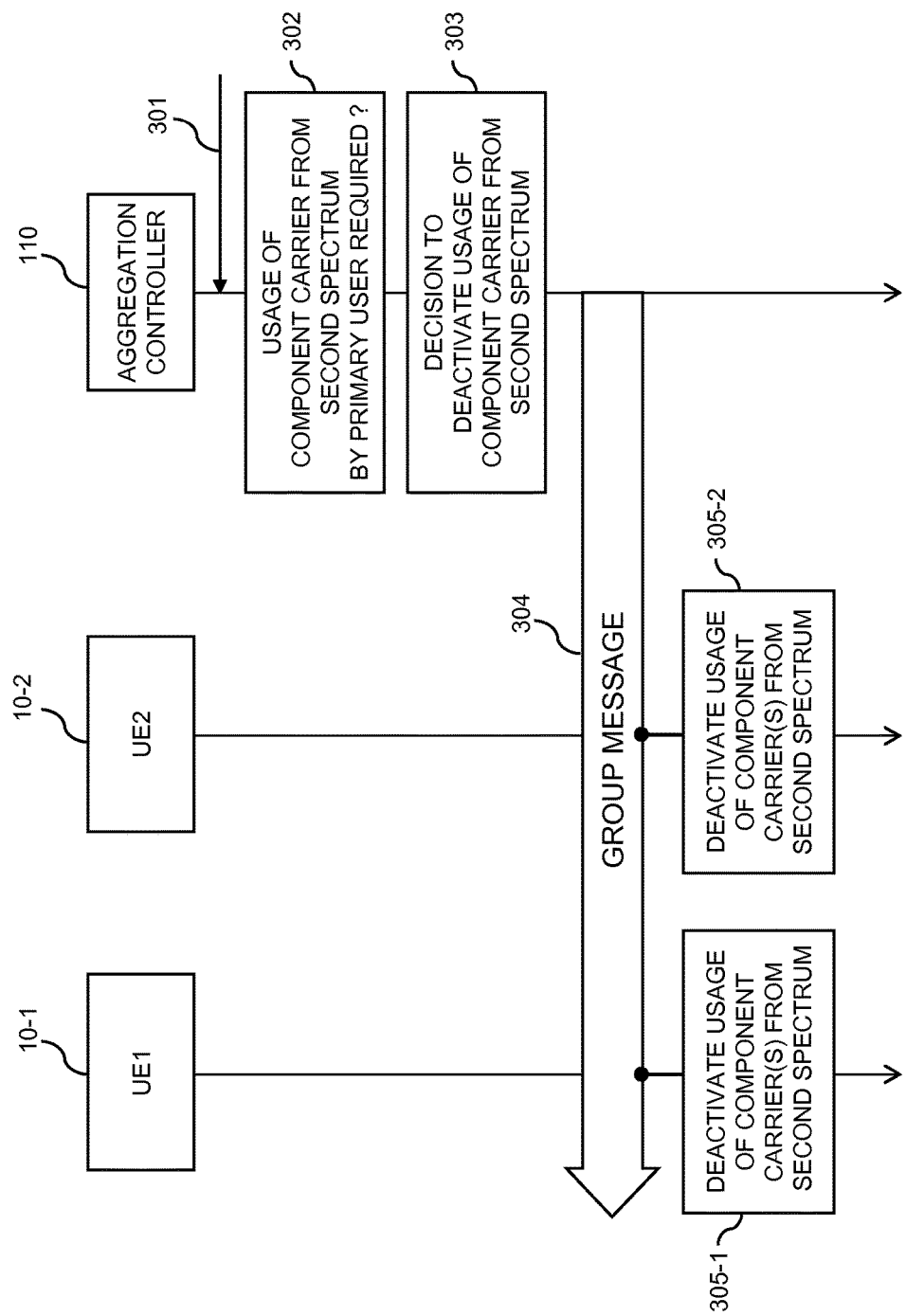
FIG. 3 shows a signaling diagram for illustrating a further exemplary scenario of controlling carrier aggregation according to an embodiment of the invention.

FIG. 3 shows a signaling diagram for illustrating further exemplary scenario of using group message based carrier aggregation control according to an embodiment of the invention. The signaling of FIG. 3 occurs between the network based aggregation controller 110 and the UEs 10-1, 10-2. It is assumed that the process starts in a situation in which both the UE 10-1 and the UE 10-2 are part of a group of UEs which are allowed to use one or more component carriers 42, 52 from one or more of the other spectra 40, 50. This group may have been established as explained in connection with FIG. 2. As in the scenario of FIG. 2, the group may be identified by a group identifier. The group identifier may for example be a Radio Network Temporary Identity. Again, the usage of the component carrier 42, 52 may be for UL communication and/or for DL communication of user data. The usage may also include performing measurements on the component carrier 42, 52 from the other spectrum 40, 50, e.g., measurements of signal quality.

As indicated by message 301, the network based aggregation controller 110 may receive an indication 301 that the component carrier 42, 52 or group of component carriers 42, 52 from the other spectrum 40, 50 are needed by a primary user of the other spectrum 40, 50. This indication 301 may be received from one of the UEs of the group and/or from the access node 120. For example, the UEs of the group and/or the access node 120 may monitor signals on the component carrier 42, 52 or group of component carriers 42, 52 from the other spectrum 40, 50 to detect operation of the primary user. This monitoring may be based on, e.g., feature detection, cyclo-stationary feature detection, and/or energy detection. Parameters to be used for this monitoring can be, e.g., detection thresholds or signatures for feature detection or cyclo-stationary feature detection. The parameters may be statically configured or may be dynamically controlled. In the case of the UEs, this dynamic control may be efficiently accomplished by transmitting a group message to the UEs, e.g., the group message 207 as explained in connection with FIG. 2. Dynamic control of the parameters may be useful, e.g., if different types of primary users need to be detected. For example, if the other spectrum 40, 50 from which the component carrier 42, 52 or group of component carriers 42, 52 is selected is a spectrum assigned to a television technology, the primary user may also be a wireless microphone system, and different types of wireless microphone systems may be used. In some embodiments, the potential presence of different types of primary users is announced to the network based aggregation controller 110, e.g., via a database, and the network based aggregation controller 110 then accomplishes dynamic configuration of the UEs for detecting these different types of primary users, which may be accomplished by transmitting a group message to the UEs. Also, in some embodiments measurements by the UEs and other nodes, e.g., the access node 120, may be synchronized. For this purpose, synchronization instances, time patterns and/or frequency patterns can be configured, thereby determining for multiple UEs when and on which frequency measurements are to be performed or transmission is prohibited. Again, at least a part of this synchronization may be accomplished by transmitting a group message to the UEs.

In response to the indication 301, the network based aggregation controller 110 decides at step 302 whether a primary user needs to use the component carrier 42, 52 or group of component carriers 42, 52 from the other spectrum 40, 50. If this is the case, the network based aggregation controller decides at step 303 to deactivate usage of the component carrier 42, 52 or group of component carriers 42, 52 from the other spectrum 40, 50.

The network based aggregation controller 110 then sends a group message 304 to the group of UEs. The group message 304 controls the UEs of the group to deactivate usage of the component carrier 42, 52 or group of component carriers 42, 52 from the other spectrum 40, 50. In some embodiments, the group message 304 may additionally control operation of the UEs of the group with respect to one or more of the component carriers 32 from the other spectrum 30, e.g., activate one or more of the component carriers 32 to replace the deactivated component carriers 42, 52. The group message 304 will be received by the UEs which are assigned to the group, in FIG. 3 represented by the UE 10-1 and the UE 10-2. For example, the UEs 10-1 and 10-2 may determine from the group identifier that they are intended recipients of group message 304. Typically, other UEs, which are not part of the group, will not be able to receive or decode the group message 304. In some embodiments, it is also possible that such other UEs will disregard the group message 304.

The group message 304 is transmitted on at least one component carrier 32 of the spectrum 30, i.e., the spectrum assigned to the radio access technology of the mobile communication system. In this way, the group message 304 can be transmitted in a reliable manner. In particular, interferences due to other users of the spectra 40, 50, in particular primary users, will not affect the transmission of the group message 304. Also, in some embodiments the group message 304 may be transmitted at a lower code rate than DL user data transmissions to the UEs of the group. In this way, the risk of the group message 304 not being successfully received by all UEs of the group can be reduced.

In the illustrated 3GPP LTE scenario, the group message 304 may be transmitted on the PDCCH. Alternatively, the group message 304 may also be transmitted on the PDSCH, e.g., by using the group identifier to address a signaling element on the PDSCH. Accordingly, when assuming that all UEs of the group are located in the same cell of the mobile communication network, the group message 304 will be transmitted on component carriers 32 allocated to all UEs of the group.

As mentioned above, the group message 304 controls UEs of the group to deactivate usage of the component carrier 42, 52 or group of component carriers 42, 52 from the other spectrum, 40, 50. For the UE 10-1 this is indicated at step 305-1, and for the UE 10-2 this indicated at step 305-2. In particular, the group message 304 may cause the UEs of the group to stop transmitting any signals on the component carrier 42, 52 or group of component carriers 42, 52. Further, the group message 304 may cause the UEs of the group to stop performing measurements on the component carrier 42, 52 or group of component carriers 42, 52. For example, the group message may cause the UEs to stop measuring the signal quality on the component carrier(s) 42, 52, to stop perform mobility measurements on the component carrier(s), to stop monitoring the PDCCH and/or PDSCH on the component carrier(s) 42, 52, to stop all ongoing UL retransmission processes for the component carrier(s), e.g., retransmission processes according to the Hybrid Automatic Repeat Request (HARQ) protocol as used according to 3GPP LTE, and/or to stop transmitting UL reference symbols on the component carrier(s). Since the deactivation of usage of the component carrier 42, 52 or group of component carriers 42, 52 from the other spectrum 40, 50 is controlled by the group message 304, which is directed simultaneously to all UEs of the group, the overall length of the deactivation procedure is effectively independent from the number of UEs using the component carrier 42, 52 or group of component carriers 42, 52 from the other spectrum 40, 50. The deactivation procedure can therefore be quick even for large numbers of UEs using the component carrier 42, 52 or group of component carriers 42, 52 from the other spectrum 40, 50.

In addition to transmitting the group message 304, the network based aggregation controller 110 can further control the access node 120 to ignore any measurement reports which are provided by UEs of the group for the deactivated component carrier 42, 52 or group of component carriers 42, 52. If the access node 120 and the network based aggregation controller 110 are implemented in the one network device 100, e.g., in the network device 100 as illustrated in FIG. 1, this control operation can be accomplished by internal control signaling between the network based aggregation controller 110 and the access node 120. In other cases, if the network based aggregation controller is implemented in another network device than the access node, this control operation can be accomplished by transmitting a control message from the network based aggregation controller to the access node.

In order to allow for controlling the deactivation of the component carriers 42, 52 in the desired manner, the group message 304 may include control data to be used by the UEs of the group for controlling their operation with respect to the component carrier 42, 52 or group of component carriers 42, 52 from the other spectrum 40, 50. For example, the group message 304 may include an indicator of the type of operation to be controlled. In the present scenario the type of operation will be deactivation of the component carriers. Further, in some embodiments the group message 304 may also include data for defining which component carriers 42, 52 from the other spectrum 40, 50 are to be deactivated. For example, when the component carriers 42, 52 in the other spectrum 40, 50 each have a unique identifier, the group message 304 could include a list of identifiers of component carriers that are to be deactivated. Each UE of the group may then compare the identifiers of its allocated component carriers 42, 52 from the other spectrum 40, 50 with the identifiers in the list and deactivate the matching component carriers 42, 52 from the other spectrum 40, 50. In other embodiments, the group identifier may be assigned in such a way that it allows for determining which component carriers 42, 52 from the other spectrum 40, 50 are to be deactivated, e.g., by providing a unique correspondence between the group identifier and the component carrier 42, 52 or group of component carriers 42, 52 that are to be deactivated.

In some embodiments, the same group identifier can be used for deactivating both UL and DL component carriers 42, 52. For example, the group message 304 could then include a list of identifiers of both UL and DL component carriers 42, 52 that are to be deactivated. In some embodiments, separate group identifiers can be provided for UL and DL component carriers 42, 52. For example, in the case of deactivating UL component carriers 42, 52, the group message 304 could then include a list of identifiers of only UL component carriers 42, 52 that are to be deactivated. Similarly, in the case of deactivating DL component carriers 42, 52, the group message 304 could then include a list of identifiers of only DL component carriers 42, 52 that are to be deactivated.

According to some embodiments, rules may be defined in the UEs for controlling their operation with respect to the component carrier 42, 52 or group of component carriers 42, 52 from the other spectrum 40, 50. For example, when assuming that there is an association of UL component carriers 42, 52 with corresponding DL component carriers 42, 52, a rule could define that the UL component carrier 42, 52 is deactivated when the corresponding DL component carrier 42, 52 is deactivated, or vice versa. In this way, deactivation would need to be explicitly signaled by the group message 304 either for only the DL component carriers 42, 52 or for only the UL component carriers. Further, when assuming that there is an association of component carriers 42, 52 from the spectra 40, 50 with corresponding component carriers 32 from the spectrum 30, a rule could define that one or more of the component carriers 32 from the spectrum 30 are activated when one or more corresponding component carriers 42, 52 from the other spectra 40, 50 are deactivated. In this way, the group message 304 could be used to replace a deactivated component carrier 42, 52 with one ore more component carrier 32 from the spectrum 30.

Figure 4:
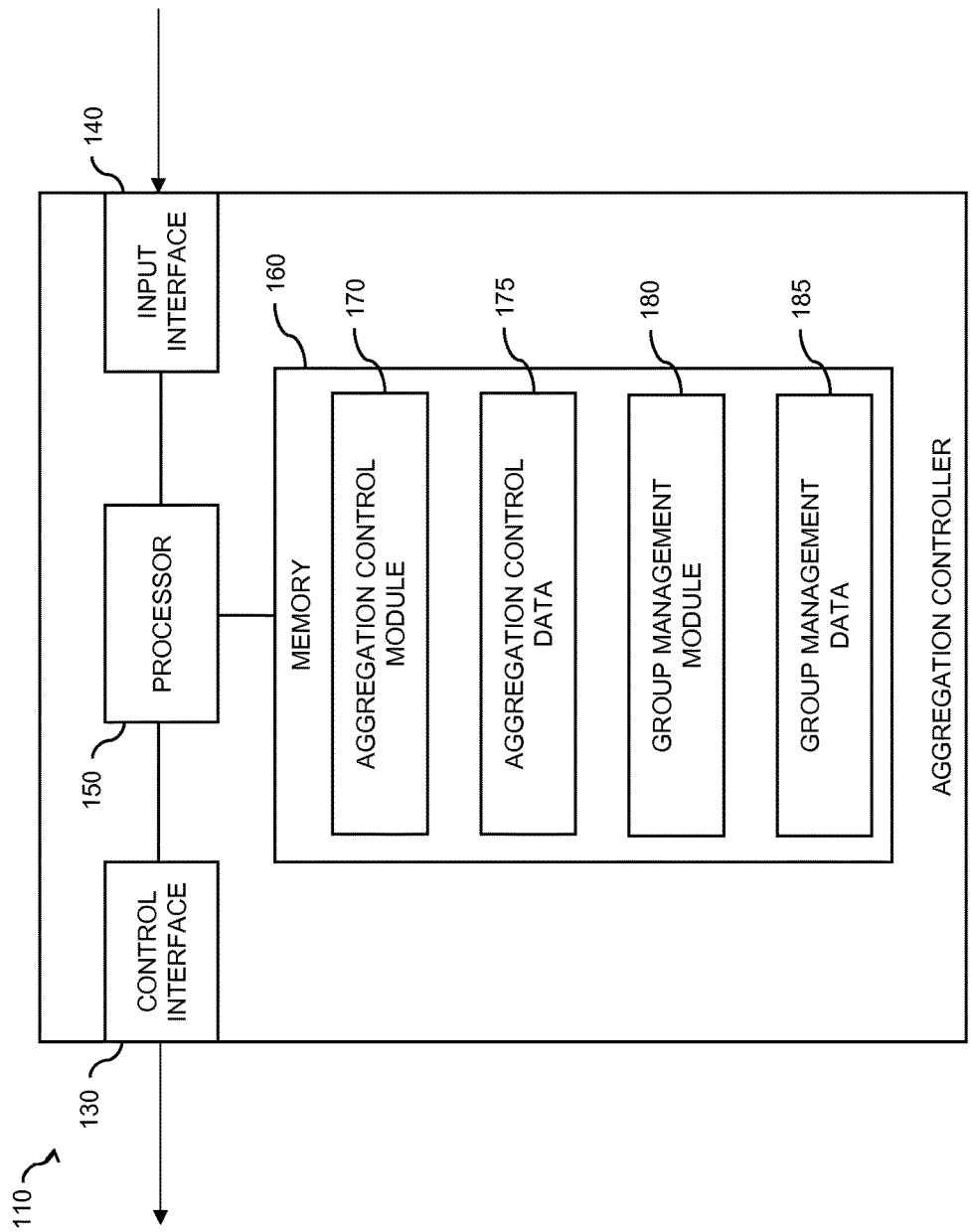
FIG. 4 schematically illustrates structures of a network based aggregation controller according to an embodiment of the invention.

FIG. 4 schematically illustrates an exemplary structure for implementing the network based aggregation controller 110.

In the illustrated structure, the aggregation controller 110 includes a control interface 130 for transmitting the above described group message 207 or 304 to the UEs 10-1, 10-2. The control interface 130 may also be used to send individual messages to the UEs 10-1, 10-2. The control interface 130 may send the group message 207 or 304 and optionally also the individual messages via a radio link, e.g., established by the access node 120 of FIG. 1. In some embodiments, the control interface 130 may also be used for transmitting control messages to other network devices, e.g., to an access node implemented in a separate network device. Further, the aggregation controller 110 may also include an input interface 140, e.g., for receiving the indication 301 of FIG. 3 or other input data, e.g., information from the UEs 10-1, 10-2. For example, the input interface 140 may be used to receive information from one or more of the UEs 10-1, 10-2 and/or a network source which allows for determining a characteristic of one or more of the UEs 10-1, 10-2 and/or from determining a characteristic of one or more of the other spectra 40, 50, e.g., as explained in connection with FIG. 2. In some embodiments, the control interface 130 and the input interface 140 may be integrated in a single bidirectional interface.

Further, the network based aggregation controller 110 includes a processor 150 coupled to the control interface 130 and the input interface 140 and a memory 160 coupled to the processor 150. The memory 160 may include a read-only memory (ROM), e.g. a flash ROM, a random-access memory (RAM), e.g. a Dynamic RAM (DRAM) or static RAM (SRAM), a mass storage, e.g. a hard disk or solid state disk, or the like. The memory 160 includes suitably configured program code to be executed by the processor 150 so as to implement the above-described functionalities of the network based aggregation controller 110. More specifically, the memory 160 may include an aggregation control module 170 so as to implement the above-described concepts of group message based control of carrier aggregation and aggregation control data 175 to be used in the aggregation control process. Further, the memory may include a group management module 180 and group management data 185 to be used by the group management module. The group management module may be used to implement processes for defining groups of UEs to be addressed by a group message, e.g., as described in connection with FIG. 2.

It is to be understood that the structure as illustrated in FIG. 4 is merely schematic and that the network based aggregation controller 110 may actually include further components which, for the sake of clarity, have not been illustrated, e.g., further interfaces. Also, it is to be understood that the memory 150 may include further types of program code modules, which have not been illustrated. According to some embodiments, also a computer program product may be provided for implementing concepts according to embodiments of the invention, e.g., a computer-readable medium storing the program code and/or other data to be stored in the memory 160.

Figure 5:
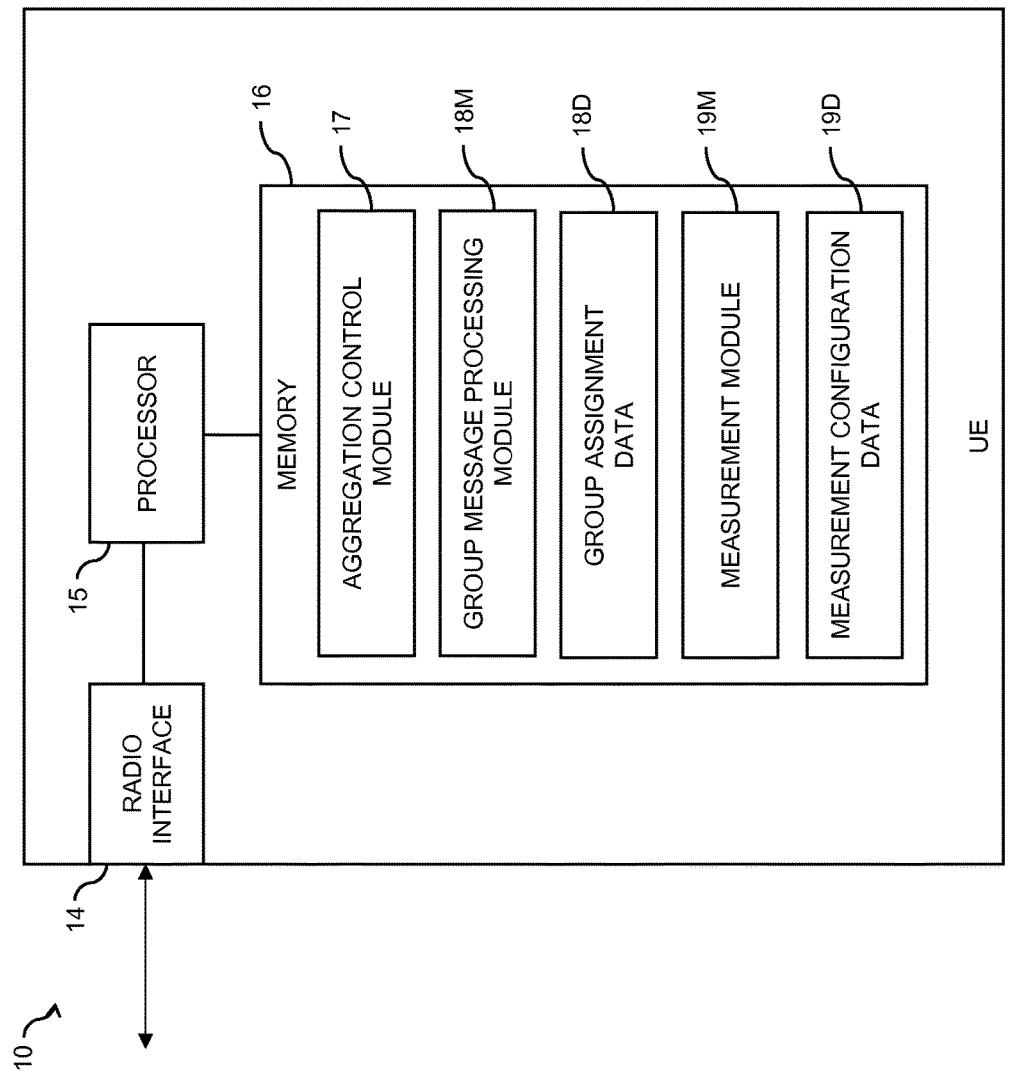
FIG. 5 schematically illustrates structures of a mobile terminal according to an embodiment of the invention.

FIG. 5 schematically illustrates an exemplary structure of an UE 10 to be used for implementing the above described concepts of group message based carrier aggregation control. In particular, the illustrated structure may be used for implementing the UEs 10-1, 10-2 as explained in connection with FIGS. 1-3.

In the illustrated structure, the UE 10 includes a radio interface 14 for receiving the above described group messages 207 or 304 from the network based aggregation controller 110. The radio interface 14 may also be used for other purposes, e.g., for transmitting messages to the network based aggregation controller 110 or for receiving individual messages from the network based aggregation controller 110.

Further, the UE 10 includes a processor 15 coupled to the radio interface 14 and a memory 16 coupled to the processor 15. The memory 16 may include a read-only memory (ROM), e.g. a flash ROM, a random-access memory (RAM), e.g. a Dynamic RAM (DRAM) or static RAM (SRAM), a mass storage, e.g. a hard disk or solid state disk, or the like. The memory 16 includes suitably configured program code to be executed by the processor 15 so as to implement the above-described functionalities of the UEs 10-1, 10-2. More specifically, the memory 16 may include an aggregation control module 17 so as to implement the above-described control operations accomplished in response to receiving the group message 207 or 304. The aggregation control module 17 may implement functionalities of the terminal based aggregation controller 11 as explained in connection with FIG. 1. Also, the memory 16 includes a group message processing module 18M which allows for receiving and/or decoding the group messages 207 or 304. The group message processing module 18M may operate in the basis of group assignment data 18D stored in the memory 16. The group assignment data 18D may for example include a group identifier of the group the UE 10 is assigned to. Further, the memory may include a measurement module 19M for controlling measurements performed by the UE 10, e.g., measurements as described in connection with FIG. 2. The measurement module 19M may operate on the basis of measurement configuration data 19D stored in the memory 16. As explained in connection with FIG. 2, the measurement configuration data 19D may be provided to the memory 16 of the UE 10 by transmitting it with the group message 207. Alternatively or in addition, the measurement configuration data 19D may also include data which are dynamically controlled by individual messages and/or statically configured data.

It is to be understood that the structure as illustrated in FIG. 5 is merely schematic and that the UE 10 may actually include further components which, for the sake of clarity, have not been illustrated, e.g., further interfaces. Also, it is to be understood that the memory 16 may include further types of program code modules, which have not been illustrated, e.g., program code modules for implementing known functionalities of an UE. According to some embodiments, also a computer program product may be provided for implementing concepts according to embodiments of the invention, e.g., a computer-readable medium storing the program code and/or other data to be stored in the memory 16.

Figure 6:
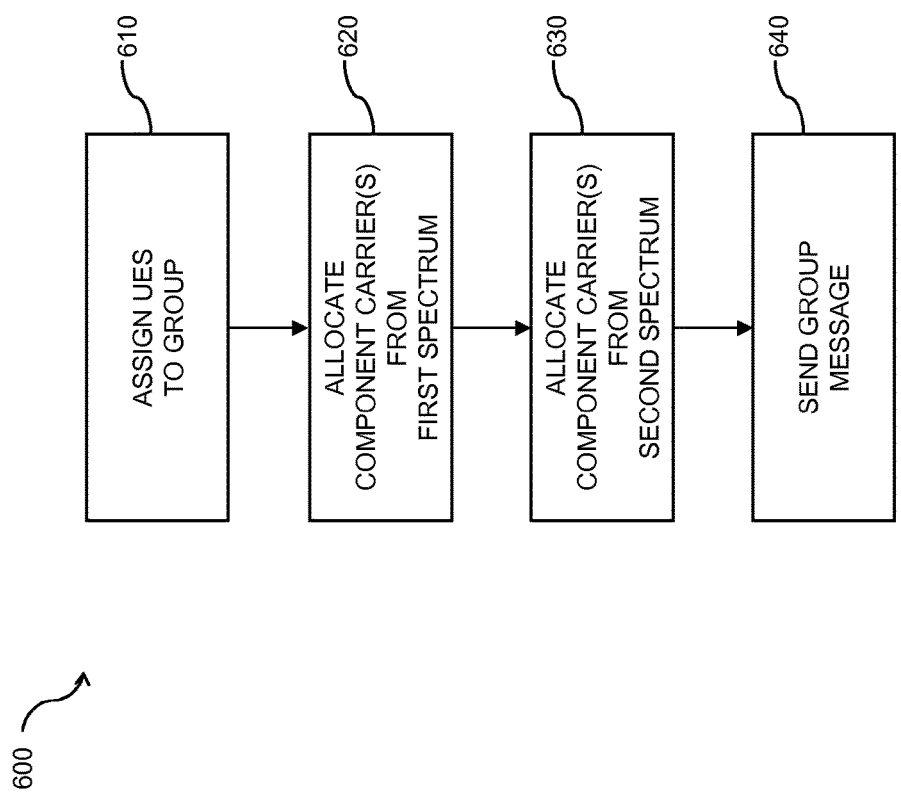
FIG. 6 shows a flowchart for illustrating a method according to an embodiment of the invention.

FIG. 6 shows a flowchart for schematically illustrating a method 600 according to an embodiment of the invention. The method 600 may be used for implementing processes for controlling aggregation of component carriers from a first spectrum, e.g., the spectrum 30 of FIG. 1, and from a second spectrum, e.g., the spectrum 40 or 50 of FIG. 1. These processes may be based on the concepts and structures as explained in connection with FIGS. 1-5. The method 600 may be implemented in a network device, e.g., in the network device 100 of FIG. 1 which includes the network based aggregation controller 110 and the access node 120.

At step 610, UEs are assigned to a group. This is done with the purpose of controlling operations of the UEs with respect to at least one component carrier from the second spectrum. The decision whether a UE is assigned to the group may be based on at least one characteristic of this UE or may be based on at least one characteristic of the second spectrum. For example, the at least one characteristic of the UE may include a capability of the UE to use the at least one component carrier from the second spectrum, a location of the UE, a velocity of the UE, a direction of movement of the UE, and/or a traffic demand of the UE. The at least one characteristic of the second spectrum may include, e.g., an availability of the second spectrum or of certain component carriers of the second spectrum. In particular, the at least one characteristic of the second spectrum may include an availability of the second spectrum or of certain component carriers of the second spectrum at the location of the UE. The at least one characteristic of the second spectrum may also include a load on component carriers of the second spectrum or an expected signal quality on component carriers of the second spectrum. The process of assigning the UEs to the group may be accomplished by the above-described network based aggregation controller 110. In some embodiments, the process of assigning the UEs to the group may also be accomplished by the network based aggregation controller 110 in cooperation with other entities, e.g., with the UEs to be potentially assigned to the group. For example, as explained in connection with FIG. 2, the UEs may provide the network based aggregation controller 110 with certain information, e.g., characteristics of the UEs, which is then used by the network based aggregation controller for taking the decision whether a particular UE should be assigned to the group or not. In some embodiments, the network based aggregation controller 110 may indicate the decision to assign a UE to the group by transmitting a message to this UE, e.g., the message 206 as explained in connection with FIG. 2. This message may also indicate a group identifier of the group to the UE.

At step 620, at least one component carrier from the first spectrum may be allocated to the UEs of the group, and at step 630 at least one component carrier from the second spectrum may be allocated to the UEs of the group. This allocation may be accomplished by an access node establishing radio links to the UEs of the group, e.g., the access node 120 explained in connection with FIG. 2. The UEs of the group may then use the allocated component carriers for receiving and/or transmitting user data on the radio links.

At step 640, a group message is transmitted to the UEs of the group, e.g., the group message 207 as explained in connection with FIG. 2 or the group message 304 as explained in connection with FIG. 3. The group message may be transmitted by the network based aggregation controller, e.g., using the control interface 130 of FIG. 4. The group message controls operation of the UEs with respect to the at least one component carrier of the second spectrum. For example, the group message may control the UEs to activate usage of the at least one component carrier of the second spectrum or to deactivate usage of the at least one component carrier of the second spectrum. In some embodiments, the group message may also control a configuration of the UEs with respect to the at least one component carrier of the second spectrum, e.g., a measurement configuration.

In some embodiments, the group message of step 640 may be used to deactivate usage of the at least one component carrier of the second spectrum in response to detecting that a primary user of the second spectrum requires usage of the at least one component carrier from the second spectrum. This detection may include receiving an indication, e.g., from one or more of the UEs of the group and/or from a network source. This is useful if the first spectrum is assigned to a radio access technology and the second spectrum is not assigned to this radio access technology, but is rather assigned to another technology, e.g., a television technology, a satellite technology, or a radar technology.

In some embodiments, the group message of step 640 may further control operation of the UEs of the group with respect to at least one component carrier from the first spectrum. For example, the group message could control activation or deactivation of the at least one component carrier from the first spectrum. In some embodiments, the group message may also control a configuration of the UEs with respect to the at least one component carrier of the first spectrum, e.g., a measurement configuration. In this way, the same group message may be used to efficiently control operations of the UEs also with respect to their operation concerning one or more component carrier from the first spectrum. For example, component carriers from both the first and second spectrum could be activated or deactivated simultaneously. Further, a component carrier from the first spectrum could be associated with a component carrier from the second spectrum, and deactivation of the component carrier from the second spectrum could at the same time initiate activation of the associated component carrier from the first spectrum. Similarly, activation of the component carrier from the second spectrum could at the same time initiate deactivation of the associated component carrier from the first spectrum In the method 600 of FIG. 6, steps 610, 620, and 630 are optional and may be rearranged. For example, the assignment of UEs to the group may be accomplished in a different manner or by a different entity. Also the allocation of steps 620 and/or of step 630 may be omitted in some embodiments. For example, in some embodiments, there may be a static allocation of component carriers. Also, in some embodiments, the group message of step 640 may be send to the UEs so as to configure the UEs for performing measurements on the at least one component carrier of the second spectrum. These measurements may be used as a basis for deciding whether one or more of the UEs should actually be allowed to used these component carriers by allocating the component carriers. Accordingly, in some embodiments the allocation of step 630 may be performed after transmitting the group message of step 640 or may be omitted, e.g., if the measurements indicate that allocation of the at least one component carrier from the second spectrum is not appropriate.

Figure 7:
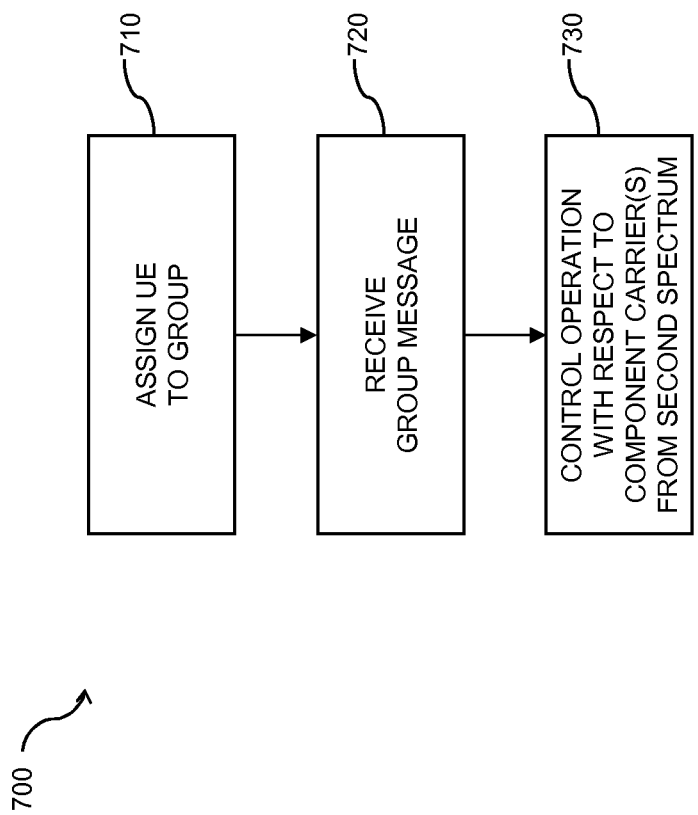
FIG. 7 shows a flowchart for illustrating a further method according to an embodiment of the invention.

FIG. 7 shows a flowchart for schematically illustrating a method 700 according to a further embodiment of the invention. The method 700 may be used for implementing processes for controlling aggregation of component carriers from a first spectrum, e.g., the spectrum 30 of FIG. 1, and from a second spectrum, e.g., the spectrum 40 or 50 of FIG. 1. These processes may be based on the concepts and structures as explained in connection with FIGS. 1-5. The method may be implemented in a UE, e.g., in one of the UEs 10-1, 10-2 as explained in connection with FIGS. 1-5.

At step 710, the UE is assigned to a group. This is done with the purpose of controlling operations of the UE with respect to at least one component carrier from the second spectrum. The decision whether the UE is assigned to the group may be based on at least one characteristic of the UE or may be based on at least one characteristic of the second spectrum. For example, the at least one characteristic of the UE may include a capability of the UE to use the at least one component carrier from the second spectrum, a location of the UE, a velocity of the UE, a direction of movement of the UE, and/or a traffic demand of the UE. The at least one characteristic of the second spectrum may include, e.g., an availability of the second spectrum or of certain component carriers of the second spectrum. In particular, the at least one characteristic of the second spectrum may include an availability of the second spectrum or of certain component carriers of the second spectrum at the location of the UE. The at least one characteristic of the second spectrum may also include a load on component carriers of the second spectrum or an expected signal quality on component carriers of the second spectrum. The process of assigning the UE to the group may be accomplished by the above-described network based aggregation controller 110. In some embodiments, the process of assigning the UE to the group may also be accomplished by the network based aggregation controller 110 in cooperation with other entities, e.g., with the UE. For example, as explained in connection with FIG. 2, the UE may provide the network based aggregation controller 110 with certain information, e.g., one or more of the above-mentioned characteristics of the UE, which is then used by the network based aggregation controller 110 for taking the decision whether the UE should be assigned to the group or not.

In some embodiments, the UE may determine a characteristic and transmit the characteristic to the network based aggregation controller. The characteristic determined by the UE may be a capability of the UE to use the at least one component carrier from the second spectrum, a location of the UE, a velocity of the UE, a direction of movement of the UE, and/or a traffic demand of the UE. The characteristic determined by the UE may also be an availability of the second spectrum or of certain component carriers of the second spectrum. In particular, the at least one characteristic of the second spectrum may include an availability of the second spectrum or of certain component carriers of the second spectrum at the location of the UE. The at least one characteristic of the second spectrum may also include a load on component carriers of the second spectrum or an expected signal quality on component carriers of the second spectrum.

In some embodiments, the UE may receive a message from the network based aggregation controller 110, which indicates the decision to assign the UE to the group. For example, this message may be the message 206 as explained in connection with FIG. 2. This message may also indicate a group identifier of the group to the UE. The UE may than store the group identifier, and thereby maintain group assignment data indicating that the UE is assigned to the group.

At step 720, a group message is received by the UE. The group message is addressed to all UEs of the group and may be transmitted by a network based aggregation controller. In some embodiments, the UE may use the group identifier to determine that it is the intended recipient of the group message. For example, the group identifier may be configured in such a way that only the UEs of the group are able to receive or decode the group message. The group message may be the group message 207 as explained in connection with FIG. 2 or the group message 304 as explained in connection with FIG. 3.

In some embodiments, the UE may detect that a primary user of the second spectrum requires usage of the at least one component carrier of the second spectrum, e.g., by monitoring radio signals. This monitoring may for example be implemented as explained in connection with FIG. 2. In response to detecting that a primary user of the second spectrum requires usage of the at least one component carrier of the second spectrum, the UE may transmit an indication to a network based aggregation controller. This indication may trigger the network based aggregation controller to transmit the group message of step 720.

At step 730, the UE controls its operation with respect to the at least one component carrier of the second spectrum. This is accomplished in response to receiving the group message of step 720. For example, the group message may control the UE to activate usage of the at least one component carrier of the second spectrum or to deactivate usage of the at least one component carrier of the second spectrum. In some embodiments, the group message may also control a configuration of the UEs with respect to the at least one component carrier of the second spectrum, e.g., a measurement configuration. The control operations of step 730 may be accomplished by a terminal based aggregation controller of the UE, e.g., the terminal based aggregation controller 11 as explained in connection with FIG. 1.

It is to be understood that the method 600 of FIG. 6 and the method 700 of FIG. 7 could be combined with each other. For example, combined usage of the methods could be implemented in a mobile communication system which includes a network based aggregation controller, e.g., the network based aggregation controller 110, and a plurality of UEs each having a terminal based aggregation controller, e.g., as the UEs 10-1, 10-2 which have the terminal based aggregation controller 11. In this case, the method 600 of FIG. 6 could be used for network based generation of the group message, which is then processed by the UEs of the group according to the method of FIG. 7.

As can be seen, by using the above described concepts, aggregation component carriers from different spectra by multiple UEs can be controlled in a very efficient manner.

It is to be understood that the examples and embodiments as explained above are merely illustrative and susceptible to various modifications. For example, the concepts could be used in other types of mobile communication network using carrier aggregation. Also, the concepts may be applied to any number of different spectra from which the component carriers can be selected. Also, it is to be understood that the concepts may be applied to multiple groups of UEs with respective group identifiers. In such scenarios, one UE could be member of different groups. Further, it is to be understood that the above concepts may be implemented by using correspondingly designed software in existing network devices or UEs, or by using dedicated hardware in the network devices or UEs.

The invention claimed is:

1. A method, by a node in a mobile communication network, of controlling aggregation of component carriers from a first spectrum that is assigned to the mobile communication network and a second spectrum that is not assigned to the mobile communication network, the method comprising:

allocating at least one component carrier from the second spectrum to a group of mobile terminals that are using component carriers from the first spectrum and that are allowed to use component carriers from the second spectrum; and in response to detecting that a primary user of the second spectrum requires usage of the at least one component carrier from the second spectrum, transmitting a group message on at least one component carrier from the first spectrum to the group of mobile terminals that are allowed to use the component carriers from the second spectrum, wherein the at least one component carrier from the second spectrum is already allocated to the group of mobile terminals that are using the component carriers from the first spectrum and that are allowed to use the component carriers from the second spectrum, and wherein said group message controls operation of the mobile terminals of the group of mobile terminals that are allowed to use the component carriers from the second spectrum to deactivate the usage of the at least one component carrier from the second spectrum.

2. The method according to claim 1, futher comprising:
determining a characteristic of a mobile terminal; and
on the basis of the characteristic of the mobile terminal, assigning the mobile terminal to the group of mobile terminals that are allowed to use the component carriers from the second spectrum.

3. The method according to claim 2,
wherein said characteristic of the mobile terminal comprises a capability to use the component carriers from the second spectrum.

4. The method according to claim 2,
wherein said characteristic of the mobile terminal comprises one or more of: a location of the mobile terminal, a velocity of the mobile terminal, and a direction of movement of the mobile terminal.

5. The method according to claim 2,
wherein said characteristic of the mobile terminal comprises a traffic demand of the mobile terminal.

6. The method according to claim 1, further comprising:
determining a characteristic of the second spectrum; and
on the basis of the characteristic of the second spectrum, assigning a mobile terminal, not yet assigned to the group of mobile terminals that are allowed to use the component carriers from the second spectrum, to the group of mobile terminals that are allowed to use the component carriers from the second spectrum.

7. The method according to claim 6,
wherein said characteristic of the second spectrum comprises an availability of the second spectrum at a location of the mobile terminal.

8. The method according to claim 1, further comprising:
assigning a group identifier to the group of mobile terminals that are allowed to use the component carriers from the second spectrum.

9. The method according to claim 1,
wherein said group message further controls operation of the mobile terminals of the group of mobile terminals that are allowed to use the component carriers from the second spectrum with respect to the at least one component carrier from the first spectrum.

10. The method according to claim 1,
wherein the at least one component carrier from the first spectrum comprises a component carrier which is allocated to all mobile terminals of the group of mobile terminals that are allowed to use the component carriers from the second spectrum.

11. The method according to claim 1,
wherein the first spectrum is allocated to a radio access technology and the second spectrum is not allocated to said radio access technology.

12. The method according to claim 1,
wherein the second spectrum is allocated to a television technology, a satellite technology, or a radar technology.

13. A non-transitory computer program product comprising program code to be executed by a processor of a device, thereby causing the device to operate in accordance with a method as defined in claim 1.

14. A method of controlling aggregation of component carriers from a first spectrum and a second spectrum, the method comprising:
transmitting a group message on at least one component carrier from the first spectrum to a group of mobile terminals, wherein said group message controls operation of the mobile terminals of the group of mobile terminals with respect to at least one component carrier from the second spectrum;
determining if a mobile terminal, not yet assigned to the group of mobile terminals, is at an edge of a coverage region of the second spectrum and further determining one or more of:
if the mobile terminal is moving at a velocity above a threshold and if the mobile terminal is moving in a direction towards outside the edge of the coverage region of the second spectrum; and
not assigning the mobile terminal to the group of mobile terminals in response to:
determining that the mobile terminal is at the edge of the coverage region of the second spectrum,
and further determining one or more of:
that the mobile terminal is moving at the velocity above the threshold and that the mobile terminal is moving in the direction towards outside the edge of the coverage region of the second spectrum.

15. A network device in a mobile communication network, the network device comprising:
a processor;
a memory, coupled to the processor, the memory storing program code configured to be executed by the processor, the memory comprising an aggregation controller, the aggregation controller configured to control aggregation of component carriers from a first spectrum that is assigned to the mobile communication network and a second spectrum that is not assigned to the mobile communication network;
an access node configured to allocate at least one component carrier from the second spectrum to a group of mobile terminals that use component carriers from the first spectrum and are allowed to use component carriers from the second spectrum; and
a control interface coupled to the processor, the control interface configured to transmit, in response to detecting that a primary user of the second spectrum requires usage of the at least one component carrier from the second spectrum, a group message on at least one component carrier from the first spectrum to the group of mobile terminals that are allowed to use the component carriers from the second spectrum, wherein the at least one component carrier from the second spectrum is already allocated to the group of mobile terminals that use the component carriers from the first spectrum and that are allowed to use the component carriers from the second spectrum, and
wherein said group message controls operation of the mobile terminals of the group of mobile terminals that are allowed to use the component carriers from the second spectrum to deactivate the usage of the at least one component carrier from the second spectrum.

16. The network device according to claim 15,
wherein said group message controls the mobile terminals of the group of mobile terminals that are allowed to use the component carriers from the second spectrum, to deactivate the usage of the at least one component carrier from the second spectrum.

17. A mobile terminal in a mobile communication network, the mobile terminal comprising:
an aggregation controller configured to control aggregation of component carriers from a first spectrum that is assigned to the mobile communication network and a second spectrum that is not assigned to the mobile communication network; and
a radio interface configured to receive a group message on at least one component carrier from the first spectrum, the group message being addressed to a group of mobile terminals that are using component carriers from the first spectrum and that are allowed to use component carriers from the second spectrum, the group of mobile terminals including said mobile terminal,
wherein the aggregation controller is configured to control operation of the mobile terminal with respect to at least one component carrier from the second spectrum to deactivate usage of the at least one component carrier from the second spectrum and to activate usage of the at least one component carrier from the first spectrum in place of the deactivated at least one component carrier from the second spectrum, in response to the received group message.

18. The mobile terminal according to claim 17, wherein said group message controls the mobile terminals of the group of mobile terminals that are allowed to use the component carriers from the second spectrum to deactivate the usage of the at least one component carrier from the second spectrum.

19. A mobile communication system, comprising:
a network based aggregation controller configured to control aggregation of component carriers from a first spectrum that is assigned to a mobile communication network and a second spectrum that is not assigned to the mobile communication network;
a group of mobile terminals; and
an access node configured to allocate at least one component carrier from the second spectrum to the group of mobile terminals, wherein the mobile terminals of the group of mobile terminals use component carriers from the first spectrum and are allowed to use component carriers from the second spectrum,
wherein the network based aggregation controller comprises a control interface configured to send, in response to detecting that a primary user of the second spectrum requires usage of the at least one component carrier from the second spectrum, a group message on at least one component carrier from the first spectrum to the group of mobile terminals that are allowed to use the component carriers from the second spectrum, wherein the at least one component carrier from the second spectrum is already allocated to the group of mobile terminals that use the component carriers from the first spectrum and that are allowed to use the component carriers from the second spectrum, and
wherein each of the mobile terminals of the group of mobile terminals comprises a radio interface configured to receive the group message and a terminal based aggregation controller configured to control operation of the respective mobile terminal to deactivate the usage of the at least one component carrier of the second spectrum in response to the received group message.

20. The mobile communication system according to claim 19,
wherein said group message controls the mobile terminals of the group of mobile terminals that are allowed to use the component carriers from the second spectrum to deactivate the usage of the at least one component carrier from the second spectrum, and
wherein the terminal based aggregation controller is configured to deactivate the usage of the at least one component carrier from the second spectrum responsive to the group message.

* * * * *